W. O. LUM.
ELECTRICAL SYSTEM FOR AUTOMOBILES.
APPLICATION FILED NOV. 29, 1915.
1,335,120.
Patented Mar. 30, 1920.
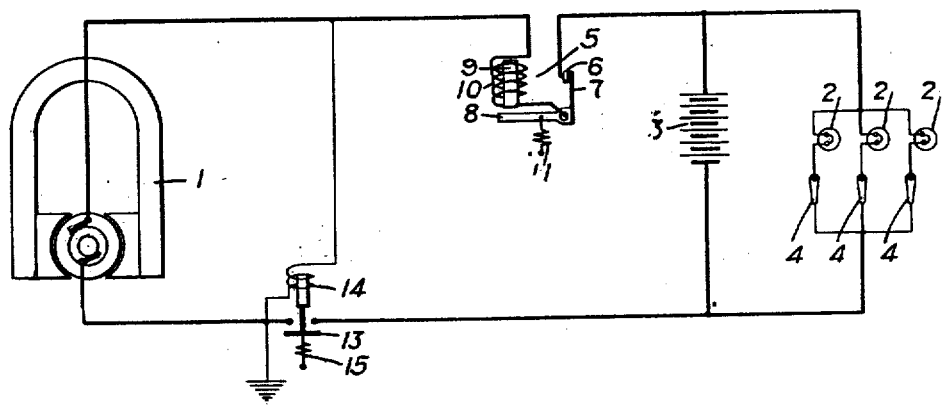
WITNESSES:
INVENTOR
Walter O. Lum.
BY
ATTORNEY

UNITED STATES PATENT OFFICE.

WALTER O. LUM, OF WILKINSBURG, PENNSYLVANIA, ASSIGNOR TO WESTINGHOUSE ELECTRIC AND MANUFACTURING COMPANY, A CORPORATION OF PENNSYLVANIA.

ELECTRICAL SYSTEM FOR AUTOMOBILES.

1,335,120.

Specification of Letters Patent. Patented Mar. 30, 1920.

Application filed November 29, 1915. Serial No. 64,042.

*To all whom it may concern:*

Be it known that I, WALTER O. LUM, a citizen of the United States, and a resident of Wilkinsburg, in the county of Allegheny and State of Pennsylvania, have invented a new and useful Improvement in Electrical Systems for Automobiles, of which the following is a specification.

My invention relates to electrical systems for automobiles and it has particular reference to lighting systems.

My invention has for one of its objects to provide a simple and efficient arrangement whereby batteries may be charged by engine driven alternators which operate at varying speeds.

A second object of my invention is to provide a simple means for protecting the lamps of lighting systems embodying sources of alternating current at varying voltages and frequencies.

In the operation of electrical systems of motor vehicles embodying alternating-current generators which are operatively connected to the engines to supply current to the lamps of the vehicles, it has, heretofore, been impossible to supply the lamps with current when the engines were at rest. Systems of the above described character possess a serious disadvantage, also, in that the lamps are subjected to voltages which vary from a zero value to values approximately double those for which the lamps are adapted. In the operation of a system of this character, it is necessary to provide additional lamps lighted from a separate source in order to illuminate the vehicle when it is stationary and the engine is at rest. The head lights of the vehicle do not sufficiently illuminate the path of the moving vehicle when the engine is operated at a slow speed as, for example, when turning sharp corners, a strong light being essential at such times.

In a system constructed in accordance with my invention, the vehicle lamps are, at all times, supplied with current. A storage battery is arranged to supply the lamps with direct current at all desired times. The storage battery is charged by an alternating-current generator that is driven by the engine. In case my invention is applied to one of the well-known Ford cars, for example, the generator is that normally employed for furnishing current for ignition purposes.

A vibrating rectifier is connected in circuit with the alternator and the battery to supply the latter with unidirectional current, the rectifier vibrating in unison with the alternations of the generator. The generator is connected in circuit with the battery when its voltage and frequency reach predetermined values and is disconnected therefrom when its voltage and frequency reach second and higher predetermined values. The main circuit of the generator is thus closed only when the voltage and frequency of the generator have values between predetermined limits. By means of this arrangement, the maximum value of the voltage to which the lamps are subjected may be controlled as desired by a suitable arrangement of the circuit-controlling mechanism.

In the accompanying drawing, the single figure is a diagrammatic view of circuits and apparatus embodying my invention.

A generator 1 may be driven by any convenient means, as, for example, the internal-combustion engine (not shown) of a motor vehicle. While I have illustrated the generator 1 in the form of a magneto, it will be understood that such illustration is by way of example only and that any other suitable form of dynamo-electric machine may be substituted therefor.

A series of lamps 2, which may be, for example, the head lights and tail light of an automobile, are connected in circuit with a storage battery 3. The respective circuits of the lamps 2 are controlled by manually operable switches 4. A vibrating rectifier 5, which may be of any usual and suitable construction, comprises a stationary contact member 6, a movable switch member 7, an armature member 8 which is secured to the switch member 7, a core member 9, a coil 10 and a spring 11 which normally retains the switch member 7 in engagement with the stationary contact member 6.

The main circuit of the generator is controlled by an electromagnetically operable switch 13 having an actuating coil 14 that is connected between the terminals of the generator 1. A spring 15 normally holds the switch in its illustrated or open position. The coil 14 is so arranged that it will be sufficiently energized to close the switch 13 when the voltage and frequency of the generator reach predetermined values. When the voltage and frequency reach second and higher predetermined values, the reactance of the coil is such that it will permit the switch 13 to open. The values of the frequency and voltage of the generator at which the switch 13 is adapted to open and close may be predetermined by properly proportioning the ampere turns and the inductance of the coil 14.

It may be assumed that the various parts occupy their respective illustrated positions and that the generator 1 has been started from rest and is driven at an increasing speed. The lamps 2 are initially supplied with current by the storage battery 3. When the voltage of the generator 1 reaches a value that is greater than that of the battery, the coil 14 is energized to close the switch 13 and thereby connect the generator in circuit with the rectifier 5, the battery 3, and the lamps 2.

The rectifier 5 operates in the usual and well-known manner to transmit unidirectional impulses in the circuits comprising the battery 3 and the lamps 2. The generator 1 operates, therefore, to charge the battery and to supply the lamps 2 with current. In case the generator 1 is driven at such speed that its voltage and frequency reach predetermined values higher than those at which the switch 13 closes, the coil 14 generates a counter electromotive force which is sufficient to reduce the effective electromotive force to a value below that necessary to maintain the closure of the switch. The switch 13 then opens to disconnect the generator 1 from the lighting circuit, and the lamps are again supplied by the battery.

When the generator voltage and frequency fall below the predetermined values at which the switch 13 is opened, the coil 14 is again energized to close the switch, and the generator supplies current for charging the battery and for lighting purposes. In case of a further decrease in voltage and frequency below the lower predetermined values, the switch 13 again opens the generator circuit.

It will be noted that the switch 13 operates to connect the generator in circuit with the battery and the lamps only when the voltage and frequency of the generator are between predetermined limits. The discharge of the battery through the generator circuit is prevented by the opening of the switch at the lower predetermined value of the generator voltage. The opening of the switch at the higher predetermined values of generator voltage and frequency serves to limit the voltage that is applied to the lamps, regardless of the speed at which the generator may be driven.

A system constructed in accordance with my invention possesses many advantages over the systems in use at present. The battery-charging system may be applied to the several types of automobiles or motor vehicles employing an alternator as the source of current for lighting and ignition purposes. The lamps may be in service at all desired times, whether the vehicle is stationary or in operation. The lamps are protected by a simple device which operates automatically to maintain the voltage to which they are subjected within predetermined limits. The above and other advantages will be readily appreciated by those skilled in the art to which my invention appertains.

I claim as my invention:

1. In an electrical system, the combination with an alternator, a battery and a lamp, of a rectifier connected between said alternator and said battery, and means for controlling the electrical connections of said devices in accordance with the frequency and voltage of the alternator.

2. In an electrical system, the combination with an alternator, a battery and a lamp, of a rectifier connected between said alternator and said battery, and means for controlling the electrical connections of said devices in accordance with predetermined maximum and minimum values of the frequency and voltage of said alternator.

3. In an electrical system, the combination with an alternator, and a consuming device, of means for connecting said alternator in circuit with said device when the frequency and voltage of said alternator are within predetermined limits.

4. In an electrical system, the combination with an alternator, a battery, and a lamp, of means for connecting said alternator in circuit with said battery and said lamp only when the frequency and voltage of the alternator are within predetermined limits.

5. In an electrical system, the combination with a source of alternating current, and a translating device in circuit therewith, of a switch for controlling the electrical connections of said source to said device, said switch having an actuating coil that is operable to effect the closing of said switch when the voltage and frequency of said source are above predetermined values and to permit the switch to open when the voltage and frequency of said source are below said predetermined values or are above second and higher predetermined values.

6. The combination with a source of alternating current and a load circuit therefor, of means operable to respectively close and open said circuit when the frequency and voltage of said source reach successively higher predetermined values.

7. In an electrical system, the combination with a source of alternating current and translating devices, of electromagnetic means for controlling the connection of said devices to said source in accordance with predetermined minimum and maximum values of the frequency and voltage of said source.

8. In an electrical system, the combination with a source of alternating current and a translating device, of electromagnetic means for connecting said translating device to said source of current and for disconnecting it therefrom when the frequency and voltage of said source reach successively higher predetermined values.

9. In an electrical system, the combination with a source of alternating current and a translating device, of electromagnetic means for connecting said device to said source when the frequency and voltage of said source are within predetermined limits.

In testimony whereof, I have hereunto subscribed my name this 24th day of Nov. 1915.

WALTER O. LUM.